(12) United States Patent
Kleijn et al.

(10) Patent No.: US 12,450,033 B2
(45) Date of Patent: Oct. 21, 2025

(54) PHOTONIC INTEGRATED CIRCUIT AND METHOD

(71) Applicant: SMART Photonics Holding B.V., Eindhoven (NL)

(72) Inventors: Steven Everard Filippus Kleijn, Eindhoven (NL); Antonio Bonardi, Eindhoven (NL)

(73) Assignee: SMART Photonics Holding B.V., Eindhoven (NL)

( * ) Notice: Subject to any disclaimer, the term of this patent is extended or adjusted under 35 U.S.C. 154(b) by 642 days.

(21) Appl. No.: 17/876,601

(22) Filed: Jul. 29, 2022

(65) Prior Publication Data

US 2022/0391174 A1 Dec. 8, 2022

Related U.S. Application Data

(63) Continuation of application No. PCT/EP2021/052192, filed on Jan. 29, 2021.

(30) Foreign Application Priority Data

Jan. 31, 2020 (GB) .................................. 2001402

(51) Int. Cl.
 *G06F 7/58* (2006.01)
 *G02B 6/42* (2006.01)

(52) U.S. Cl.
 CPC ........... *G06F 7/588* (2013.01); *G02B 6/4206* (2013.01); *G02B 6/4298* (2013.01)

(58) Field of Classification Search
 CPC ...... G06F 7/588; G02B 6/4206; G02B 6/4298

USPC ........................................................... 359/107
See application file for complete search history.

(56) References Cited

U.S. PATENT DOCUMENTS

| | | | |
|---|---|---|---|
| 6,539,410 B1 * | 3/2003 | Klass | H04L 9/0852 |
| | | | 708/3 |
| 9,916,132 B2 | 3/2018 | Yuan et al. | |
| 10,540,146 B1 | 1/2020 | Vakili | |
| 2014/0337400 A1 | 11/2014 | Chong et al. | |
| 2015/0193207 A1 * | 7/2015 | Pooser | G06F 7/588 |
| | | | 708/255 |
| 2015/0331672 A1 | 11/2015 | Yuan et al. | |
| 2018/0232208 A1 * | 8/2018 | Chong | G01J 1/0425 |

(Continued)

FOREIGN PATENT DOCUMENTS

| | | |
|---|---|---|
| CN | 107658694 A | 2/2018 |
| CN | 110196710 A | 9/2019 |

(Continued)

OTHER PUBLICATIONS

United Kingdom Search Report dated Jun. 21, 2021 for GB Application No. GB2001402.3.

(Continued)

*Primary Examiner* — Stephone B Allen
*Assistant Examiner* — Boutsikaris Leonidas
(74) *Attorney, Agent, or Firm* — EIP US LLP (57) ABSTRACT

A photonic integrated circuit, PIC, for use in generating a random number. The PIC comprising: light source on a substrate; a light detector on the substrate configured to, in response to receipt of light from the light source, output an electrical signal for use in generating the random number; and a light guidance system on the substrate configured to direct light from the light source to the light detector.

24 Claims, 3 Drawing Sheets

(56) References Cited

U.S. PATENT DOCUMENTS

2019/0356394 A1\* 11/2019 Bunandar .............. G06N 3/084
2019/0369965 A1    12/2019 Choi et al.

FOREIGN PATENT DOCUMENTS

| CN | 110569022 A   | 12/2019 |
|----|---------------|---------|
| EP |   2788863 A1  | 10/2014 |
| EP |   3588269 A1  |  1/2020 |
| WO | 2013082672 A1 |  6/2013 |
| WO | 2017019507 A1 |  2/2017 |
| WO | 2017193106 A1 | 11/2017 |
| WO | 2019006039 A1 |  1/2019 |

OTHER PUBLICATIONS

International Search report and Written Opinion dated May 21, 2021 for International PCT Application No. PCT/EP2021/052192.
Sunada et al., "Chaos laser chips with delayed optical feedback using a passive ring waveguide", Optics Express, vol. 19, No. 7, pp. 5713-5724, XP055803347, Mar. 28, 2011 (Mar. 28, 2011).
Verschaffelt et al., "Design and characterization of a laser integrated with long on-chip optical feedback usable as compact random number generator", Proceedings of SPIE, vol. 10682, pp. 106821P-106821P, XP060108280, May 9, 2018 (May 9, 2018).
ID Quantique SA, "ID Quantique White Paper", Random Number Generation Using Quantum Physics, Version 3.0, Apr. 1, 2010.
Japanese Office Action dated Nov. 27, 2024 for Japanese Application No. 2022-543628.

\* cited by examiner

PHOTONIC INTEGRATED CIRCUIT AND METHOD

CROSS-REFERENCE TO RELATED APPLICATIONS

This application is a continuation of International Application No. PCT/EP2021/052192, filed Jan. 29, 2021 which claims priority to United Kingdom Application No. GB 2001402.3, filed Jan. 31, 2020, under 35 U.S.C. § 119(a). Each of the above referenced patent applications is incorporated by reference in its entirety.

BACKGROUND

Random number generators are known which are based on the inherently random behaviour of photons caused by quantum mechanics effects. For example, behaviour of a single photon can be determined and used to generate a truly random number.

It is desirable to provide an improved random number generator based on photon detection.

DETAILED DESCRIPTION

Examples described herein relate to a photonic integrated circuit (PIC) for use in generating a random number, based on the behaviour of photons according to quantum mechanics effects. In particular, with optical components for generating a random number formed on a single substrate, in other words on a common substrate, the PIC can be considered a monolithic PIC. The substrate is for example a compound of elements from groups III and V of the Periodic Table, for example a so-called III-V semiconductor compound such as Indium Phosphide (InP). Such a PIC can be fully contained without optical input or output and is sufficiently compact that it can be integrated in devices such as computers and smart phones. Indeed, such a PIC is more compact, and more simple in construction and operation than known random number generators. For example, the PIC is of or less than 100 microns×1000–4000 microns× 4000 microns.

Figure 1:
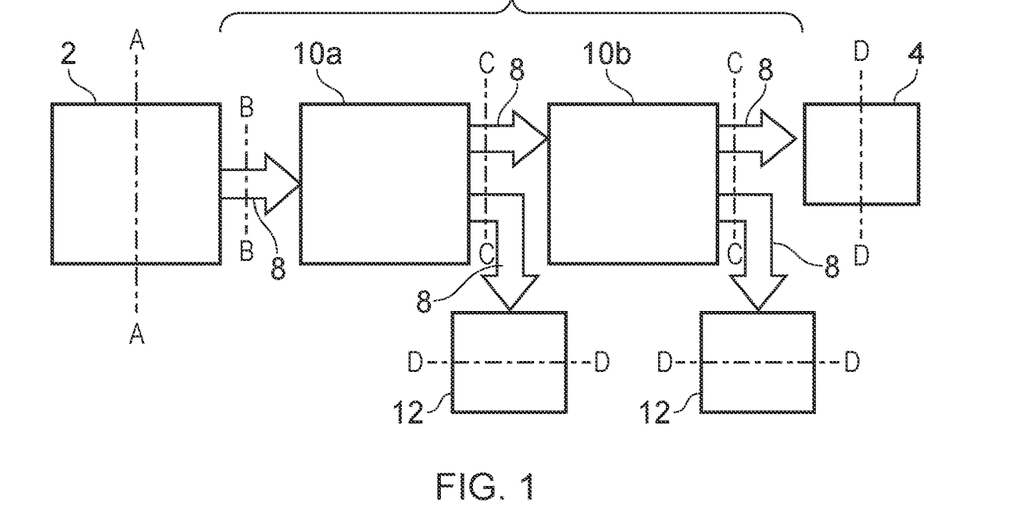
FIG. 1 shows schematically a system for generating a random number, in accordance with examples.
Figure 4:
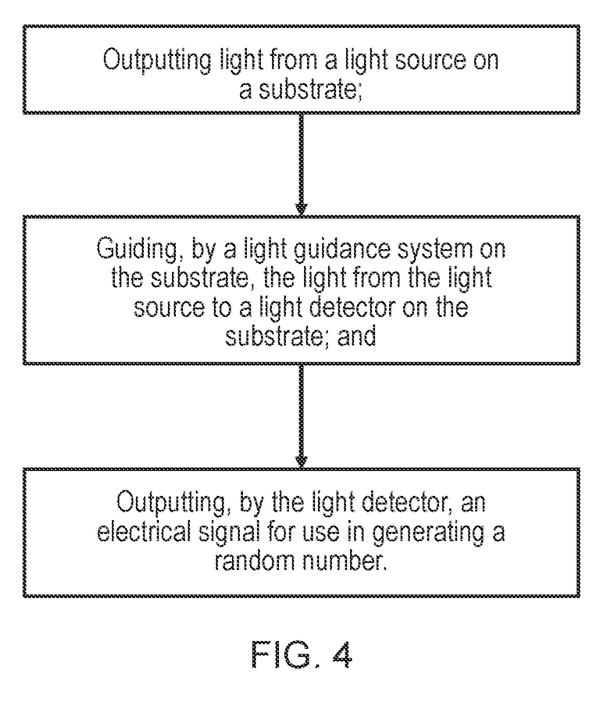
FIG. 4 is a flow diagram illustrating a method of generating a random number according to examples.

FIG. 1 illustrates schematically a system of examples for generating a random number, implemented at least in part as a PIC on a common substrate which is for example of a III-V semiconductor compound such as InP. FIG. 4 illustrates a flow diagram of a method for generating a random number.

The PIC for use in generating the random number comprises a light source 2 on the substrate (illustrated later with FIG. 3), a light detector 4 on the substrate, and a light guidance system 6 on the substrate and configured to direct light from the light source to the light detector. Waveguides 8 (illustrated schematically as arrows) of the light guidance system guide light from the light source to the light detector 4. Light from the light source, when incident on, in other words received by, the light detector 4 causes the light detector to output an electrical signal for use in generating the random number This is explained in further detail later. The light source is for example a semiconductor optical amplifier (SOA) or a laser. The light detector, in other words a photodetector, is for example a photodiode capable of detecting a low light intensity. Such a photon detector is simpler than in known examples referred to as 'single-photon detectors' which use more complex or design limiting detectors such as a silicon photomultiplier (SiPM) avalanche photodiode. Further, the photodiode in examples is a monolithically integrated photodiode with a sampling rate of at least giga-Hertz (GHz) frequencies; this offers quicker operation, and hence quicker generation of random numbers, than photodetectors in known systems. Plus, such photodiodes with such GHz or higher sampling rates can detect larger magnitude photocurrents than known photodetectors, which overcomes background electronic noise even more so that quantum effects related fluctuations dominate even more.

Figure 2A:
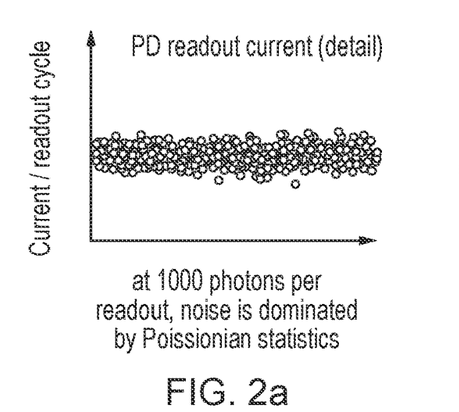
FIGS. 2a and 2b show plots relating to an electrical current readout of a light detector, according to examples.
Figure 2B:
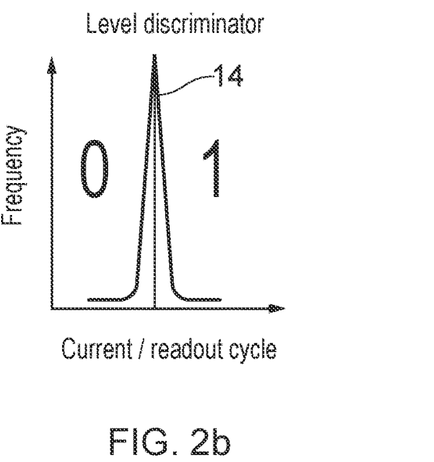
Figure 3:
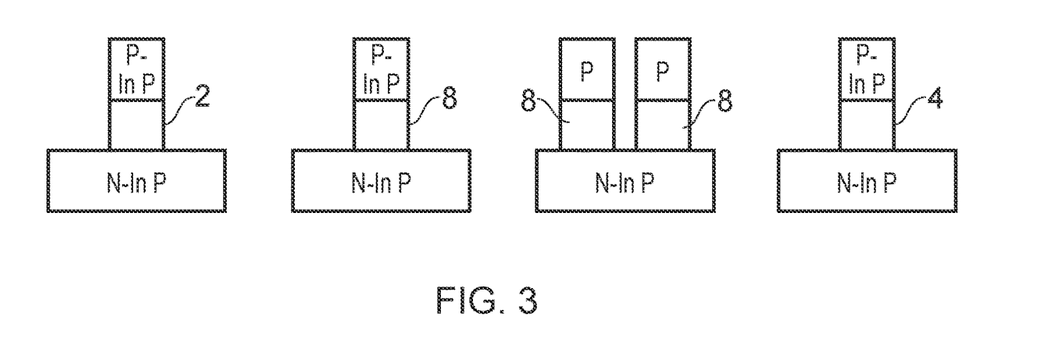
FIG. 3 shows schematically cross-sections of a photonic integrated circuit (PIC) of examples, such as those of FIG. 1.

In examples such as those of FIGS. 1 to 3, there is a light attenuation system on the common substrate. The attenuation system is configured to attenuate an intensity of light output from the light source to an intensity used by the light detector 4 for use in generating a random number. Hence, between the light source and the light detector 4, the attenuation system reduces the intensity of light. In examples such as that of FIGS. 1 to 3, the attenuation system comprises one or more light splitters 10 such as passive light splitters on the common substrate. FIG. 1 shows two such light splitters, but this is schematic; a first light splitter 10a receives light from the light source before other of the light splitters, such as a second light splitter 10b, receives light from the light source (via the first light splitter). FIG. 1 is schematic in that although first and second light splitters are shown, in some other examples there may be only one such light splitter, and in other examples there may be more than two light splitters, as required to reduce the light intensity to a level suitable for the light detector 4 (and the overall system set up) to be used in generating a random number.

A suitable level is sufficiently low such that any fluctuations in the light intensity detected by the light detector 4 are dominated by quantum effects, and hence are in accordance with Poisson statistics. Otherwise, for a higher intensity, and hence a larger number of photons detected per sample by the light detector, any fluctuations caused by quantum effects would be masked, and hence too negligible, relative to the total number of photons detected per sample, to be satisfactorily detectable and used for random number generation. The skilled person is familiar with Poisson statistics and hence the Poisson probability distribution which describes the probability of a number of events occurring in a given time period, with the events occurring at a known constant mean rate and which are independent of the time since the last event. Application of the Poisson distribution in generating a random number is explained further below.

Typically, the standard deviation, or inherent fluctuation, of the Poissonian distribution is the square root of the mean sample size. Therefore, the variation relative to the mean sample size decreases with more photon counts per sample. On the other hand, low photon counts, especially single photon counting, requires optimised photo diodes and electronics. An InP PIC features a high sample-rate and low electronic background noise of the photodiode. Therefore, at photon counts of 1000 photons per sample, the inherent quantum fluctuation is still well above (at least ~10×) the electronic background current. At a high sample rate these 1000 photons per sample will still generate an appreciable photodiode current that can be measured with conventional readout electronics.

The light source, light detectors and light splitters of the light attenuation system are optically connected to each other, as appropriate, by the light guidance system such as waveguides 8. Hence, an input of the first light splitter is optically connected by a waveguide to receive light from the light source, in some examples directly, and an output of the first light splitter is optically connected by a waveguide to either an input of a subsequent light splitter, or to a light detector. Each splitter may be considered to guide or redirect portions of the light from the input to the outputs of the splitter, but as the function of the splitter is to reduce the intensity of light propagating from the light source, the splitters are described herein as part of the light attenuation system.

The light attenuation system in some examples is configured to, between the light source and the light detector 4, attenuate the intensity of light from the light source by a factor of at least 1000. So, for example light incident on the light detector 4 has an intensity of at most 0.1% of that output by the light source.

As the skilled person will appreciate, such attenuation can be achieved in different ways. Examples described herein use light splitters. Each light splitter splits light originating from the light source into a first portion of light for propagation to the light detector 4 by the light guidance system, and into a second portion of light which is not guided to the light detector 4. A plurality of light splitters may be arranged in series with each other, such that the first portion of light output from one light splitter is guided onwards to be input to the next light splitter in the series, which in turn outputs its first portion of light to be guided onwards to any subsequent light splitters in the series, in turn, until reaching the light detector 4.

Each light splitter of the attenuation system is for example a light filter, and is for example a multimode interferometer (MMI) which the skilled person is familiar with. In an MMI, for example, the waveguide width is increased to transition the light from single mode propagation to multimode propagation. The spatial distribution of the optical modes changes as a function of the MMI length, and the appropriate distribution required for a particular splitter's application can be calculated using numerical computation. In the case of a 1×2 splitter, 2 waveguides are fabricated at the length from the start of the MMI where two modes have formed and are spatially well separated.

Depending on the specification of each splitter, each splitter reduces the light intensity in some examples by 50% (such that the first portion of light is 50% and the second portion of light is 50% the intensity of light input to the splitter), and in other examples each splitter reduces the light intensity by 70% (such that the first portion of light is 30% and the second portion of light is 70% the intensity of light input to the splitter). In the former case, ten so-called 50:50 splitters are used in series in some examples, to reduce the intensity for the light detector 4; in the latter case, six so-called 30:70 splitters are used in series in other examples to reduce the intensity for the light detector 4. In further examples different splitting ratios are envisaged.

An MMI is an example of a passive light splitter which does not require driving by a voltage in order to function (as would be the case for an active component). Using passive light splitters in the light attenuation system means that a higher power can be used for the light source, which in turn can reduce the need for, and/or the power requirements of, circuitry for driving active components elsewhere in the PIC. Plus, as will be explained further below, such a passive light splitter means that the intensity of light output by the light source can be monitored, which in turn can assist calibration and tuning of the system for generating the random number.

The light detector 4 described so far is also referred to herein as a first light detector. In addition, in some examples such as that of FIG. 1, there is one or more second light detector 12 each respectively optically connected by a waveguide 8 to receive the second portion of light output from a respective light splitter 10. Each second light detector is of the same type of photodiode as the first light detector, but in other examples may be a different type. For example, the first light detector is a balanced photodiode or another type of optimised high-accuracy photodiode; the second light detector may be the same or a different type of light detector.

The PIC comprises first circuitry for processing an electrical signal output by each of the one or more second light detectors. Such a second light detector is for example used to monitor the intensity of light output by the light source. If the second light detector detects a deviation from a target intensity, which indicates that the intensity of light in the first portion guided onwards to the light detector has also deviated, appropriate action can be taken. For example, for one of or each second light detector, the first circuitry receives the electrical signal from the respective second light detector. A property (e.g. electrical current) of the electrical signal is measured, to determine a magnitude of the property which is indicative of an actual intensity of light output by the light source. If it is determined that the actual intensity of light output by the light source is different from a target intensity of light to be output by the light source (e.g. on the basis that the second portion of light should be 50% the intensity of light output by the light source), the first circuitry can cause an appropriate response to maintain the system's ability to generate a random number. Such a response may be to adjust a current applied to the light source, to adjust the intensity of light output by the light source. In this way, if the intensity of the second portion is less than the target intensity, the current can be increased to increase the intensity of light output by the light source, to reduce a difference between the actual intensity and the target intensity. Further, or alternatively, such a response can be to calibrate a process (described further below) for generating the random number, by adjusting at least one of a threshold value, or a magnitude of a property (e.g. electrical current) measured from the electrical signal output by the first light detector 4, to compensate for any deviation in light intensity from the light source. Otherwise, such a deviation may cause the system to fail, in that any supposedly random number generated is not in fact truly random. Such monitoring is performed at least by the second light detector which receives the second portion of light from the first light splitter in the series, and in some examples more than one of the second portion of light from a light splitter in the series is used to monitor the attenuation. For example, the second portion of light from each light splitter is output respectively to a different second light detector, so that each attenuation step by a splitter is monitored, and any deviation from a target intensity adjusted for in the current applied to the light source and/or in the processing of the electrical signal output by the first light detector 4.

Generation of a random number is now explained. The PIC comprises second circuitry configured to use the electrical signal output by the first photodetector 4 for generating a random number. Generally, the second circuitry receives the electrical signal output by the light detector 4 and determines, based on a property (e.g. electrical current) of the electrical signal a value for use in generating the random number. Such a value is in these examples a binary value, otherwise known as a bit, with a value of either 1 or 0. A string of binary values may be generated based on a series of measurements of the electrical current; one binary value per measurement. The property of the electrical signal measured varies, or fluctuates, over a period of time, caused by quantum effects affecting the passage of photons from the light source to the first light detector 4. This means that the number of photons incident on the light detector 4 is different at different moments in time, in turn causing the fluctuation of the property of the output electrical signal. Such fluctuations are truly random as they are dictated by quantum effects, and can be used as the basis of determining each binary value in turn, to generate a truly random string of binary values. Such a string can in turn be used to generate a truly random number such as a base-10 integer number.

Various methods are envisaged to use the fluctuations in the property of the electrical signal output by the first light detector 4 in generating a random number. For example, as the fluctuations are dictated by quantum effects, the measurements fit the Poisson distribution. Hence, each measurement of the property of the electrical signal can be compared against the Poisson distribution, or a parameter derived therefrom, to determine the value (e.g. a 1 or a 0) yielded for each measurement, for generating the random number.

FIG. 2a shows an example plot of many electrical current measurements of the electrical signal output by a light detector 4. The plot assumes 1000 photons are detected per measurement (referred to as a readout in the Figure), with the x axis being time and the y axis the electrical current magnitude for each readout. Each readout can be considered a sample of the electrical current, with subsequent samples taken regularly at intervals of equal time duration apart from each other. As can be seen from FIG. 2a, the current per readout fluctuates about an average magnitude which is illustrated by the concentration of data points along a horizontal band on the plot. FIG. 2b shows the same readouts now plotted as a histogram, with electrical current magnitude for each readout on the x axis and the frequency of each measurement on the y axis. The histogram plot is a Poisson distribution. An average readout, in these examples an average electrical current magnitude, is determined. This average is for example a mean value which corresponds with the most commonly measured electrical current magnitude, as shown by the vertical line 14 in FIG. 2b. Such an average value is set as a threshold value for determining which value to assign for use in generating the random number, or in other examples it is envisaged that a different statistical value may be calculated and used to set the threshold value. After determining the average value, each subsequent measurement of the property such as electrical current is corresponded with the average value. For example, a difference between the measurement and the threshold value is calculated, or it is determined whether the measurement is greater or less than the threshold value. The magnitude of the difference, or simply whether the measurement is greater or less than the threshold value can be used to determine the value assigned from the measurement, for generating the random number. For example, FIG. 2b shows that if the measurement is less than the threshold value 14, a bit value of 0 is determined and recorded in the bit string, whereas if the measurement is greater than the threshold value 14, a bit value of 1 is determined and recorded in the bit string. This method is repeated for each subsequent measurement, to generate a string of bit values which is randomly generated given its dependence on quantum effect based fluctuations in the light intensity on the light detector 4. The interval separating each subsequent measurement from an immediately previous measurement, and hence a sampling frequency, may be set by the particular light detector used, or controlled by the second circuitry based on a clock signal. Thus, the second circuitry in examples receives the electrical signal output by the first light detector 4, measures a property (e.g. electrical current) of the electrical signal at a first moment in time; then based on the measured property determines that a magnitude of the measured property is less than a threshold value; and on this basis determines a first value (e.g. a bit value, for example 0 according to FIG. 2b) for use in generating the random number. A similar process is performed for the next measurement, at a second moment in time immediately subsequent to, but separated by a sampling cycle time period, the first moment in time. Although, if that second measurement of the property is greater than the threshold value instead, the second value (e.g. a bit value, for example 1 according to FIG. 2b) is determined with a different value to the first value.

In some examples, the threshold value is determined before the circuitry starts to generate a random number. Measurements of the property of the electrical signal output by the light detector 4 may be sampled over a given period of time, sufficiently long to determine an average value (e.g. the mean) of the Poisson distribution of measurements. This average value is then set as the threshold value for use in determining the values (e.g. bits) based on future fluctuations of the property. In other examples, a threshold value may be determined and stored during a calibration process during manufacture, before shipping the circuit to a consumer, again by measuring the property over a sufficiently long period of time to determine the average value for the Poisson distribution.

As explained earlier, the intensity of light output by the light source, and/or in any second portion of light output by a light splitter 10, may deviate from a target intensity. Such deviations may be greater than any fluctuation caused by quantum effects. By monitoring any such deviations using the one or more second photodetectors 12, the process for determining values (e.g bit values) for the random number generation may be adjusted accordingly. For example, an offset corresponding to the deviation is applied to a measured magnitude of the property, to compensate for the deviation such that a correct comparison against the threshold value is made. Alternatively, the threshold value may be adjusted in correspondence with any such deviation, again so that a correct comparison of the measured magnitude against the threshold value is made. Or, if any such deviation is sufficiently large or prolonged, a reset of the threshold value may be made, by performing a calibration process again to determine the average value according to the Poisson distribution.

In particular examples, it is envisaged that the light source outputs light with an intensity of 200 microWatts ($\mu$W), an attenuation factor of 1000 by the attenuation system, a sampling rate of 1 GHz, a threshold value of 0.16 microAmps ($\mu$A) and a conversion efficiency that the first light detector 4 converts photons into electrons (and hence measurable electrical current) of 100%. FIG. 3 shows, from left to right, cross-sections taken respectively along lines A-A, B-B, C-C and D-D in FIG. 1 of example layers of the PIC.

The light source, waveguides 8 and photodiode 4 are shown each between a substrate of N—InP compound and a p-type compound such as P—InP, P—InGaAs, P—InAlAs, P—InAlGaAs or P—InGaAsP (with Ga as gallium, As as arsenic, Al as aluminium and P as phosphorus. The semiconductor material which the light detector and photodiode are based on is the same in some examples but is different in other examples. Any materials which are secondary to the functionality described herein, such as electronic conductivity or passivation against the environment are not illustrated for clarity.

On this basis, the light intensity measured by the first light detector 4 can fluctuate by up to 3.1%; as these fluctuations are based on quantum effects, the range of readout magnitude values (of the electrical current) covered by the Poisson distribution is 3.1%. Such a sufficiently large fluctuation range is useful for determining whether each measurement is greater or less than the threshold value; this determination can be more difficult with a smaller fluctuation range. A fluctuation range of 3.1% is notably greater than the range of fluctuation obtainable by systematic fluctuations in a PIC without the light attenuation system described herein. Note that a decrease of the intensity of light output by the light source, a decrease of the conversion efficiency, an increase in the attenuation factor and/or an increase in the sampling rate, the fluctuation range can increase. In contrast, an increase of the intensity of light output by the light source, an increase of the conversion efficiency, a decrease in the attenuation factor and/or a decrease in the sampling rate, can cause the fluctuation range to decrease.

Electronic circuitry such as the first and second circuitry described herein may be implemented using at least one processor and at least one memory storing instructions which, when executed on the at least one processor, perform the method of any example described herein at least in relation to the first or second circuitry. The at least one processor is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The first and second circuitry may be provided together as a single printed circuit board (PCB) or each of the first and second circuitry may be implemented on one or more substrates, and connected accordingly to the PIC. Appropriate power circuitry is envisaged too, as the skilled person will understand, for powering the PIC and first and second circuitry.

As the skilled person will appreciate, various techniques may be used to deposit and pattern the layers of semiconductor material in accordance with examples described herein. Such techniques may include chemical vapour deposition techniques such as metalorganic vapour-phase epitaxy (MOVPE) or molecular beam epitaxy (MBE). Etching techniques may be used to remove portions of material, as part of patterning, as the skilled person will appreciate.

Figure 5:
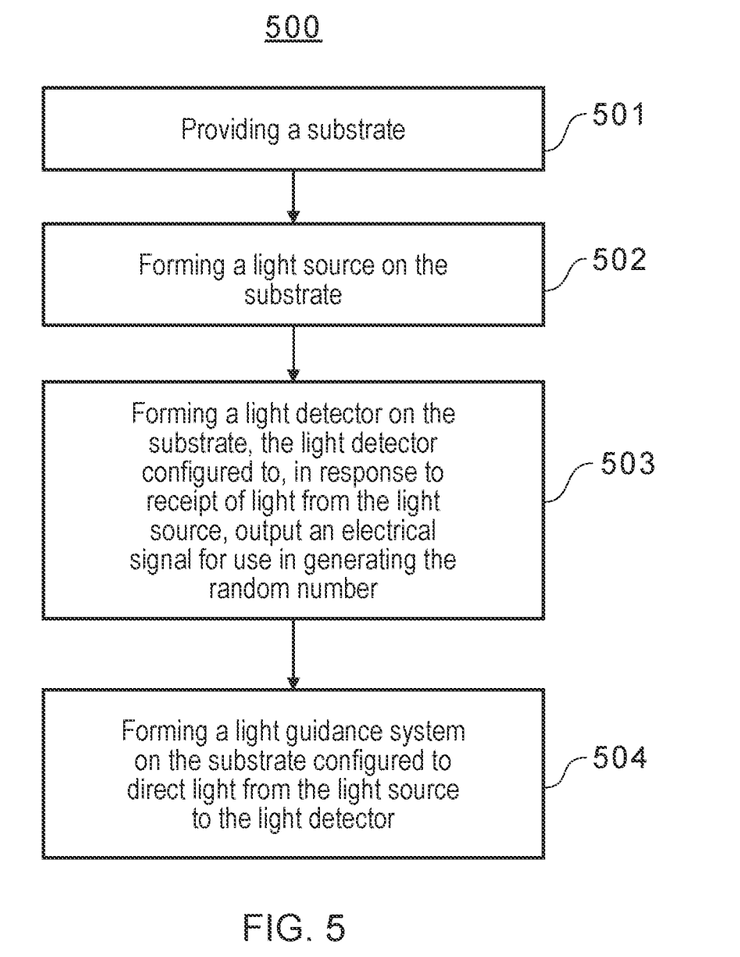
FIG. 5 illustrates a manufacturing method of examples.

Hence, in accordance with examples, and see 501 to 504 of FIG. 5, a PIC of examples described herein is manufactured by a method comprising: providing the substrate; forming the light source on the substrate; forming the first light detector on the substrate, the first light detector configured to, in response to receipt of light from the light source, output an electrical signal for use in generating the random number; and forming the light guidance system on the substrate configured to direct light from the light source to the first light detector. Further, the method in examples comprises: forming the light attenuation system on the substrate configured to, between the light source and the light detector, attenuate an intensity of light from the light source such that fluctuations in the intensity of light detected by the light detector are dominated by Poisson statistics. Further still in examples, the method comprises forming a plurality of the second light detectors described above, the light attenuation system comprises a series of passive light splitters, each of the series of passive light splitters respectively configured to split light from the light source into a first portion of light for propagation to the first light detector by the light guidance system, and a second portion of light for propagation to a second light detector of the plurality of second light detectors for use in at least one of: adjusting a current applied to the light source to adjust the intensity of light output by the light source, to reduce a difference between an actual intensity output by the light source and a target intensity to be output by the light source; or calibrating, on the basis of a difference between the actual intensity and the target intensity, a process for generating the random number.

The above examples are to be understood as illustrative examples. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A photonic integrated circuit, PIC, for use in generating a random number, comprising:
    a light source on a substrate;
    a light splitter configured to split light from the light source into a first portion of light and a second portion of light;
    a first light detector on the substrate configured to, in response to receipt of the first portion of light, output first electrical signal for use in generating the random number;
    a light guidance system on the substrate configured to direct the first portion of light to the first light detector;
    a second light detector on the substrate, configured to receive the second portion of light, for monitoring the intensity of light output by the light source to detect deviation from a target intensity; and
    circuitry configured to:
        i) receive an electrical signal output by the second light detector;
        ii) determine a magnitude of the electrical signal output by the second light detector, the magnitude indicative of the intensity of light output by the light source;
        iii) determine that the intensity of light output by the light source is different from the target intensity; and
    in response to iii), at least one of:
        iv) adjust a current applied to the light source to adjust the intensity of light output by the light source, to reduce a difference between the intensity of light output by the light source and the target intensity; or
        v) calibrate, on the basis of a difference between the intensity of light output by the light source and the target intensity, a process for generating the random number.

2. The PIC of claim 1, wherein:
the substrate is of at least one of: a III-V semiconductor compound, or Indium Phosphide, InP.

3. The PIC of claim 1, comprising,
a light attenuation system on the substrate configured to, between the light source and the first light detector, attenuate an intensity of light from the light source such that fluctuations in the intensity of light detected by the light detector are dominated by Poisson statistics.

4. The PIC of claim 3, the light attenuation system configured to, between the light source and the first light detector, attenuate the intensity of light from the light source by a factor of at least 1000.

5. The PIC of claim 1, wherein the light splitter comprises at least one of:
on the substrate, a passive light splitter;
on the substrate, a series of passive light splitters; or
on the substrate, a series of passive light splitters, each passive light splitter comprising a multimode interferometer (MMI).

6. The PIC of claim 1, wherein the circuitry is first circuitry, and the PIC comprises second circuitry configured to:
a) receive the first electrical signal); and
b) determine, based on a property of the first electrical signal, a value for use in generating the random number.

7. The PIC of claim 1, wherein the circuitry is first circuitry, and the PIC comprises
second circuitry configured to:
a) receive the electrical signal output by the first light detector;
b) measure a property of the electrical signal received in a) at a moment in time;
c) based on the property measured in b), determine that a magnitude of the property measured in b) is less than a threshold value; and
d) on the basis of c), determine a value for use in generating the random number.

8. The PIC of claim 1, wherein the circuitry is first circuitry, and the PIC comprising:
second circuitry configured to:
a) receive the first electrical signal;
b) measure a property of the electrical signal received in a) at a first moment in time;
c) based on the property measured in b), determine that a magnitude of the property measured in b) is less than a threshold value; and
d) on the basis of c), determine a value for use in generating the random number, wherein the value for use in generating the random number is a first value, the second circuitry configured to:
e) measure the property of the first electrical signal received in a) at a second moment in time;
f) based on the property measured in e), determine that a magnitude of the property measured in e) is greater than the threshold value; and
g) on the basis of f), determine a second value, different from the first value, for use in generating the random number,
or
second circuitry configured to:
a) receive the first electrical signal;
b) measure a property of the electrical signal received in a) at a first moment in time;
c) based on the property measured in b), determine that a magnitude of the property measured in b) is less than a threshold value; and
d) on the basis of c), determine a value for use in generating the random number, wherein the value for use in generating the random number is a first value, the second circuitry configured to:
e) measure the property of the first electrical signal received in a) at a second moment in time;
f) based on the property measured in e), determine that a magnitude of the property measured in e) is greater than the threshold value; and
g) on the basis of f), determine a second value, different from the first value, for use in generating the random number, wherein the second value is a binary value.

9. The PIC of claim 6 wherein at least one of:
the property is electrical current; or
the second circuitry is configured to:
a) receive the first electrical signal;
b) measure a property of the electrical signal received in a) at a moment in time;
c) based on the property measured in b), determine that a magnitude of the property measured in b) is less than a threshold value; and
d) on the basis of c), determine a value for use in generating the random number, wherein the threshold value is a mean magnitude of the property of the electrical signal.

10. A method of generating a random number, comprising:
i) outputting light from a light source on a substrate;
ii) splitting light from the light source, by a light splitter, into a first portion of light for propagation to a first light detector and a second portion of light for receipt by a second light detector;
iii) guiding, by a light guidance system on the substrate, the first portion of light from the light source to the first light detector on the substrate;
iv) monitoring, by the second light detector, the intensity of light output by the light source to detect deviation from a target intensity;
v) determining a magnitude of an electrical signal output by the second light detector, based on the second portion of light, the magnitude indicative of the intensity of light output by the light source;
vi) determining, based on the magnitude, that the intensity of light output by the light source is different from the target intensity of light to be output by the light source; and
in response to vi), at least one of:
vii) adjusting a current applied to the light source to adjust the intensity of light output by the light source, to reduce a difference between the intensity of light output by the light source and the target intensity; or
viii) calibrating, on the basis of a difference between the intensity of light output by the light source and the target intensity, a process for generating the random number; and
ix) outputting, by the light detector, an electrical signal for use in generating a random number.

11. The method of claim 10, wherein the substrate is of at least one of: a III-V compound, or Indium Phosphide, InP.

12. The method of claim 10, comprising:
attenuating, by a light attenuation system on the substrate, and between the light source and the first light detector, an intensity of light from the light source such that fluctuations in the intensity of light detected by the light detector are dominated by Poisson statistics.

13. The method of claim 12, the light attenuation system configured to, between the light source and the first light detector, attenuate the intensity of light from the light source by a factor of at least 1000.

14. The method of claim 13, wherein the light splitter comprises
a series of passive light splitters.

15. The method of claim 14, wherein each of the at least one passive light splitter is respectively multimode interferometer (MMI).

16. The method of claim 10, comprising:
a) determining, based on a property of the first electrical signal, a value for use in generating the random number.

17. The method of claim 10, comprising:
a) measuring a property of the first electrical signal;
b) based on the property measured in a), determining that a magnitude of the property measured in a) is less than a threshold value; and
c) on the basis of b), determining a value for use in generating the random number.

18. The method of claim 17, wherein the moment in time is a first moment in time and the value for use in generating the random number is a first value, the method comprising:
d) measuring the property of the first electrical signal at a second moment in time;
e) based on the property measured in d), determining that a magnitude of the property measured in d) is greater than the threshold value; and
f) on the basis of e), determining a second value, different from the first value, for use in generating the random number,
or
d) measuring the property of the first electrical signal at a second moment in time;
e) based on the property measured in d), determining that a magnitude of the property measured in d) is greater than the threshold value; and
f) on the basis of e), determining a second value, different from the first value, for use in generating the random number, wherein the second value is a binary value.

19. The method of claim 16, wherein the property is electrical current.

20. The method of claim 17, wherein the threshold value is a mean magnitude of the property of the first electrical signal.

21. A method of manufacturing a photonic integrated circuit for use in generating a random number, comprising:
providing a substrate;
forming a light source on the substrate;
a light splitter configured to split light from the light source into a first portion of light and a second portion of light;
forming a first light detector on the substrate, the light detector configured to, in response to receipt of the first portion of light from the light source, output first electrical signal for use in generating the random number;
forming a light guidance system on the substrate configured to direct light from the light source to the light detector
forming a second light detector on the substrate, configured to receive the second portion of light, for monitoring the intensity of light output by the light source to detect deviation from a target intensity; and
providing circuitry configured to:
i) receive an electrical signal output by the second light detector;
ii) determine a magnitude of the electrical signal output by the second light detector, the magnitude indicative of the intensity of light output by the light source;
iii) determine that the intensity of light output by the light source is different from the target intensity; and
in response to iii), at least one of:
iv) adjust a current applied to the light source to adjust the intensity of light output by the light source, to reduce a difference between the intensity of light output by the light source and the target intensity; or
v) calibrate, on the basis of a difference between the intensity of light output by the light source and the target intensity, a process for generating the random number.

22. The method of claim 21, comprising forming a light attenuation system on the substrate configured to, between the light source and the first light detector, attenuate an intensity of the first portion of light from the light source such that fluctuations in the intensity of light detected by the light detector are dominated by Poisson statistics.

23. The PIC of claim 1, wherein the circuitry is first circuitry, and the PIC comprises second circuitry configured to:
a) receive the first electrical signal;
b) measure a property of the electrical signal received in a) at a moment in time;
c) based on the property measured in b), determine that a magnitude of the property measured in b) is less than a threshold value; and
d) on the basis of c), determine a value for use in generating the random number, wherein the value for use in generating the random number is a binary value.

24. The method of claim 10, comprising:
a) measuring a property of the first electrical signal;
b) based on the property measured in a), determining that a magnitude of the property measured in a) is less than a threshold value; and
c) on the basis of b), determining a value for use in generating the random number, wherein the value for use in generating the random number is a binary value.

* * * * *